United States Patent [19]
Mayer et al.

[11] 4,116,444
[45] Sep. 26, 1978

[54] METHOD FOR GENERATING A PLURALITY OF MOVING OBJECTS ON A VIDEO DISPLAY SCREEN

[75] Inventors: Steven T. Mayer, Auburn; Ronald E. Milner, Grass Valley, both of Calif.

[73] Assignee: Atari, Inc., Sunnyvale, Calif.

[21] Appl. No.: 706,121

[22] Filed: Jul. 16, 1976

[51] Int. Cl.² .................................................. A63F 9/02
[52] U.S. Cl. ......................... 273/101.2; 273/DIG. 28; 340/324 AD
[58] Field of Search .................. 35/11 R, 11 A, 12 N, 35/25; 273/85 G, 101.2, DIG. 28, 1 E; 364/200, 900; 340/172.5, 324 AD, 324 M; 358/104, 142, 93

[56] References Cited

U.S. PATENT DOCUMENTS

| | | | |
|---|---|---|---|
| 3,396,377 | 8/1968 | Strout | 340/324 AD |
| 3,528,068 | 9/1970 | Johnson | 340/324 AD |
| 3,685,038 | 8/1972 | Flanagan | 340/324 AD |
| 3,747,087 | 7/1973 | Harrison et al. | 340/324 AD |
| 3,750,135 | 7/1973 | Carey et al. | 340/324 AD |
| 3,893,075 | 7/1975 | Orban et al. | 340/172.5 |
| 4,026,555 | 5/1977 | Kirschner et al. | 273/85 G |
| 4,034,983 | 7/1977 | Dash et al. | 273/85 G |
| 4,053,740 | 10/1977 | Rosenthal | 273/85 G X |

OTHER PUBLICATIONS

*Decuscope;* vol. 1, No. 1; "Plays at Spacewar"; Apr., 1962.
*Decus Proceedings;* "Spacewar!Real-Time Capability of the PDP-1"; 1962; pp. 37,38.

*Primary Examiner*—Vance Y. Hum
*Attorney, Agent, or Firm*—Flehr, Hohbach, Test, Albritton & Herbert

[57] ABSTRACT

A method for generating a plurality of moving objects on a video display screen in, for example, a video amusement game which utilizes a system of time shared hardware to provide for a change in position of the moving objects on the video screen. The method includes an object storage memory which may be updated during each vertical retrace interval and is scanned during each horizontal retrace interval to provide information for a horizontal memory which generates the next horizontal video display line. The horizontal memory contains an object identification code in the proper horizontal location and the actual video image is generated by an associated graphics generator and picture memory which respond to the object code.

7 Claims, 3 Drawing Figures

METHOD FOR GENERATING A PLURALITY OF MOVING OBJECTS ON A VIDEO DISPLAY SCREEN

BACKGROUND OF THE INVENTION

The present invention pertains generally to the display of video images and more particularly to a method for generating a plurality of moving objects on a video display screen in the context of a video amusement game.

One example of a system for causing images of objects to move about on the screen of a video display tube under the control of an operator in U.S. Pat. No. 3,793,483 issued Feb. 19, 1974, in the name of Nolan Bushnell entitled "Video Image Control System for Amusement Device" and assigned to the present assignee. This patent shows a separate motion counting or comparator circuit for each moving object to be displayed. In other words, with multiple objects multiple counters or comparators are required which can result in relatively complex and expensive circuitry.

A copending application, now U.S. Pat. No. 4,016,362, Ser. No. 626,665 filed Oct. 29, 1975 in the name of Stephen Bristow entitled "Multiple Image Positioning Control System and Method" and assigned to the present assignee provides a multiple object display system utilizing logic for ordering the various displayed objects.

The basic objective in the display of multiple objects is that the logic system must be able to control the intensity of one or more electron beams as a television monitor is scanned. The scanning rate for standard monitors is too fast for on-line output by low cost computers of all of the information needed to represent the image. Thus a buffer is required. The motion control logic discussed above is one type of buffer.

In one of the common existing systems, the logic or computer output is stored in a display memory of one or more television fields in length. The organization of the list is such that it is searched in time sequence with the television monitor raster. Thus, data required for the beam control is available at the time required. The limitation in this approach is the size of the memory. For a video display with 256 vertical and 512 horizontal possible positions, a memory of the product or 131,072 bits is required. If multiple objects are to be displayed and if each object must retain an identification code for later use, the memory must be increased by a multiple of the identification code length. Such a large memory is not economically feasible in games.

Another approach used in the graphics display field is the use of a pair of memories, for example, of the shift register type for the horizontal lines to be displayed. In operation while one horizontal television line is being displayed the command list is checked to see if any points are to be displayed during the next line. Actual video data is set in the first line memory while the second line memory is being displayed. In order to properly load the memory, hardware is required to calculate the "a" intersect of a display command. This approach requires extensive and costly control and memory circuits. It also does not retain the unique identification of the video for each object.

OBJECTS AND SUMMARY OF THE INVENTION

It is, therefore, a general object of the present invention to provide an improved method for controlling the position of multiple objects on a video display screen.

It is another object of the invention to provide a method as above which provides a display of a relatively large number of moving objects while minimizing costs of associated logic circuitry.

It is another object of the invention to provide an improved method of displaying the playfield on which said objects move.

In accordance with the above objects there is provided a method for generating a plurality of moving objects on a video display screen which is scanned in successive frames by an image forming beam traversing the screen. The beam traverses the screen along a plurality of horizontal lines in response to horizontal and vertical synchronizing signals which also provide horizontal and vertical retrace. Manual control inputs are provided for a plurality of game players. The control inputs determine the motion of the objects. The method comprises the following steps. Data is stored indicative of the locations at which the objects are to be displayed on the screen. During a horizontal retrace interval the stored data is scanned to determine any locations to be displayed for the next horizontal line to be scanned. Information is temporarily stored in locations in a random access memory representing the next horizontal line in accordance with the stored location. An output display signal is delivered when the position of the beam corresponds to the stored location. The stored data of the first step is updated during vertical retrace in response to a player control input.

DETAILED DESCRIPTION OF THE PREFERRED EMBODIMENT

Figure 1:
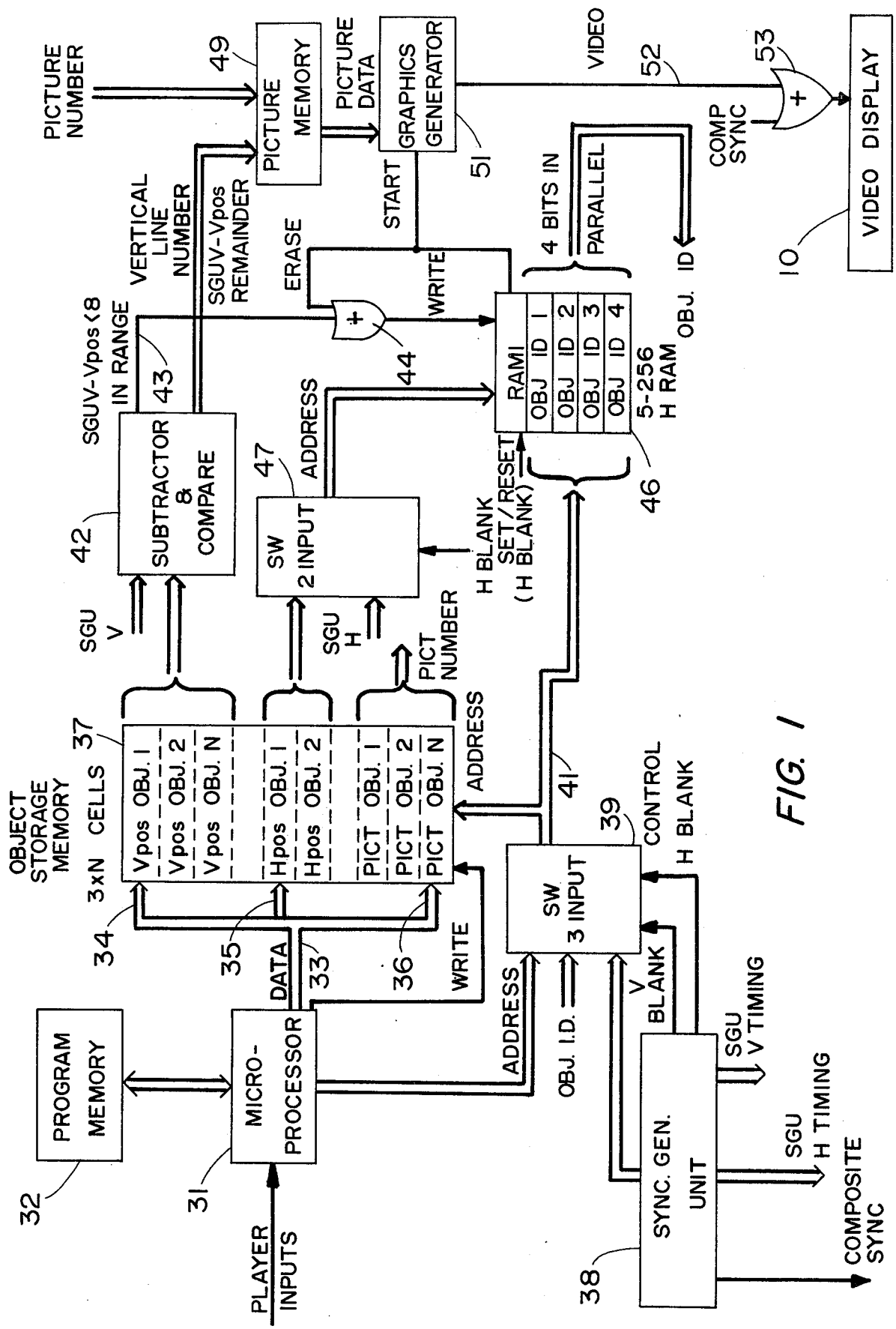
FIG. 1 is a block diagram illustrating the circuit of the present invention.
Figure 2:
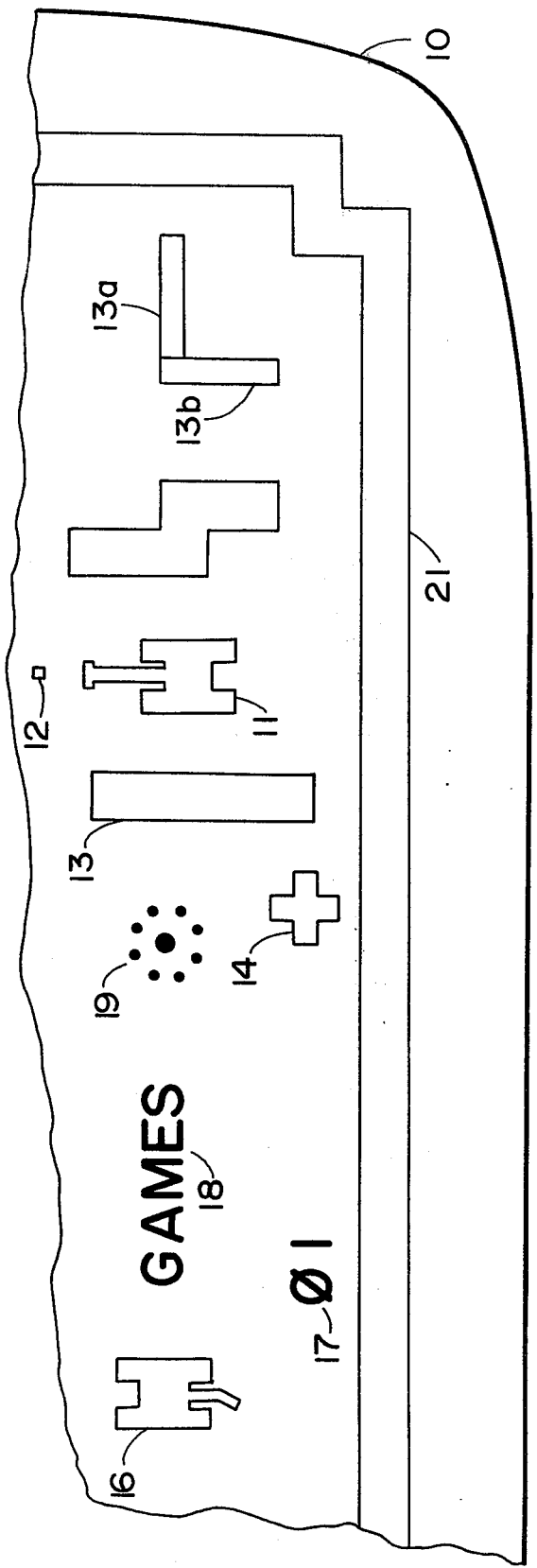
FIG. 2 illustrates a typical picture on a portion of a TV screen of the type of objects in a game for which the present invention finds use.

Referring now to FIG. 1, the various moving objects which are generated by the present invention occur on the TV raster type video display screen 10. A typical set of moving objects is shown in FIG. 2 which is a simulated portion of the video display screen 10 and where one moving object would be a player tank 11 and another a shell 12 which would be fired from the tank at another tank.

Very briefly, the video game for which the present invention is a preferred embodiment is a tank battle game designed for as many as eight players where each player is assigned a unique tank 11. Manual controls are provided each player which consist of two levers or joysticks plus a push-button switch mounted on top of one lever. The tanks are maneuvered by the joysticks and the players try to shoot the opponents's tanks by use of the push-button which fires the shell 12. The players must also contend with various stationary obstacles dispersed about the battle field which include wall barriers 13, mines 14 and broken tanks 16. A hit made on an opponent tank adds one point to a player's score. Each player's accumulated score is displayed continuously as shown by the score numerals 17. Other message characters as indicated at 18 are provided such as "10 Seconds to Game Time." Finally, an exploding shell is shown at 19. Of the objects displayed in FIG. 2, the moving objects are the player tanks 11 and the shells 12. All other objects provided are regarded as relatively stationary and are generated by a playfield generator as shown in FIG. 3.

Figure 3:
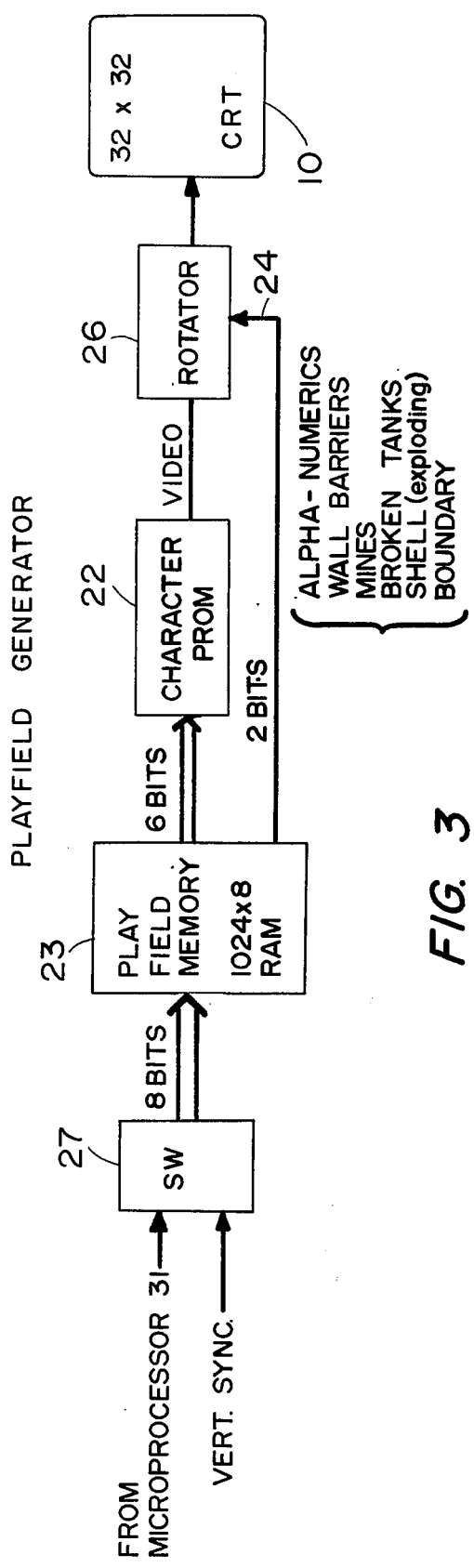
FIG. 3 is a block diagram of another portion of the control system of the present invention.

Referring specifically to FIG. 3, the video display or cathode ray tube 10 is broken up into a 32 by 32 matrix for the purpose of displaying the various playfield building blocks. They are listed and have their actual video display characteristic or shape stored in a character programmable read-only memory (PROM) 22 in a building block format. That is, a boundary 21, for example, is composed of several segments and depending on the configuration of the boundary 21, these various segments are arranged in the proper format by the random access or playfield memory (RAM) 23. This memory controls the character PROM 22 by 6 bit information to which the character prom responds by providing a proper building block. An additional 2 bits from the playfield memory 23 on the line 24 activates a rotator unit 26 which acts on the video output of PROM 22 to rotate a building block or alpha-numeric character to any of the four points of the compass. Thus, with a game such as illustrated in FIG. 2 which is in a horizontal plane, since as many as eight players gather around it, the alpha-numeric characters can be displayed in a proper position for each of the players. Also in the case of, for example, the wall sections 13a and 13b these would be provided by the same data in the character PROM 22 with merely a 90° rotation.

The random access playfield memory 23 is set up by 8 bits of data through the switch from the microprocessor 31, illustrated in FIG. 1, during the vertical retrace interval.

Thus, in general with the use of the rotator 26 and the generalized building blocks and the character PROM the amount of memory required is reduced and the flexibility of the playfield enhanced. By merely reprogramming the microprocessor and the memory 22 a different type of playfield can easily be provided.

Referring now to FIG. 1 which is the moving object generator for the tanks 11 and shells 12, a microprocessor 31 is connected to a program memory 32 to provide for overall control of the various logic circuits of the game of the present invention. The microprocessor 31 stores the horizontal and vertical address of each of, for example, eight tanks and eight shells to be displayed and in addition, assigns an object identification number of each of 1, 2, ... n where n in this embodiment is 16. The vertical and horizontal position data provides the upper left hand corner of the displayed object with the remainder of the object being generated by logic circuitry to be described below. The horizontal and vertical position data is read out of the microprocessor on its data line 33 which is connected to three different sections 34, 35 and 36 of an object storage random access memory (RAM) 37.

Object storage memory 37 contains predetermined memory locations of 1 through n for the horizontal and vertical positions of the objects and in addition picture information such as the rotation of a particular tank which may be in one of 28 different angular orientations. The memory 37 includes 3 × n cells or memory locations. The position in the memory determines the display priority of the object if more than one object occupies the same screen position. Thus, no ordering takes place as taught by the above Bristow application. The position is represented by 8 bits of data which however can easily be expanded for higher resolution. Since the physical memory location corresponds to the object identification number the address output of the microprocessor 31 when addressing memory 37 corresponds to the object identification number. The picture number output from memory section 36 carries with it rotation information of a tank which, of course, is a player input.

Overall control of the timing of the microprocessor 31 comes from the sync generator unit 38 (SGU) which has the outputs of vertical and horizontal (V and H) timing and blanking and composite sync all of which correspond to normal signals associated with a television type video display. The vertical and horizontal blanking output of sync generator 38 control the switch 39 which accepts the object ID and the addresses from microprocessor 31 and connects them via the address line 41 to the object storage RAM 37.

In operation during the vertical blanking interval microprocessor 31 addresses the object storage memory 37 and writes in vertical, horizontal and picture data for any or all objects.

During the horizontal retrace or blanking interval of each line of the video display 10 the object storage RAM 37 is scanned by timing signals from the SGU and the vertical position for each object is compared to the vertical count of the sync generator 38. If the difference, Δ, is within a preset number such as 8 corresponding to the vertical size of the object to be displayed, this is sensed by the compare and substractor unit 42. This unit provides an in-range output on line 43 through an inclusive OR gate 44 to a horizontal RAM memory 46. This memory will eventually contain or have stored in it object identification number. In actual practice the horizontal random access memory 46 stores in each of 256 possible locations corresponding to the actual physical location of the beam image to be displayed 5 bits of information which consist of a write token and a 4 bit object ID. The four bit object ID provides a binary count of zero through 15 or will accommodate 16 different moving objects in the present implementation. Storage in the proper horizontal location in the memory 46 is accomplished through switch 47 which accepts the horizontal positions from object storage 37.

Storage of information in the horizontal memory 46 (H RAM) is done during the horizontal blanking interval as discussed above. If any objects stored in vertical position is within Δ television lines of the vertical timing, the stored horizontal position (H POS) of the object becomes the address (see line 48 from switch 47) for the H RAM 46. The data written into the H RAM is the address (object ID) of the object storage RAM supplied by line 41 from switch 39 with the first position of the RAM, i.e., RAM 1, being written with a "1" taken indicating an object to be displayed is present in this horizontal location.

In operation, as discussed, during the vertical retrace interval object memory 37 is updated; during horizontal retrace H RAM 46 is updated. Finally during the active television line the following takes place. The H RAM is scanned in time sequence by the horizontal timing signals. If a "1" or display token is detected in RAM 1, the graphics generator 51 is started. RAM 1 is also written with a $\phi$ to clear it through gate 44 thus preparing the RAM for the next line. The object memory 37 is accessed by the object ID output into switch 39. The appropriate picture number is routed to picture memory 49 along with the V POS data. The above is repeated on a line by line basis until a complete frame is displayed and vertical retrace again occurs.

A picture memory 49 defines graphics game rules and contains the actual picture data (defining for example the pictorial configuration of a tank) which when transferred to a graphics generator 51 is converted to video data on line 52 and through summer 53 (also driven by composite sync) drives video display 10. Picture memory 49 receives the difference or remainder of the stored vertical position (V POS) substracted from the actual vertical line number (SGUV) this remainder being indicative of the vertical line of the object to be displayed. In addition, the picture number from memory 37 provides the object ID (i.e., tank or shell) along with rotational information. Picture memory 49 is generally a programmable read only memory but may be random access in order to allow easy programming to vary the Thus, the present invention provides a video game which accommodates a large number of moving objects, for example, between eight and 32 with relatively limited memory. This is accomplished by time sharing the object storage RAM 37, H RAM 46, graphics generator 51 and position memory 49. Moreover, since one line memory 46 need store only the object identification code and not the full video information, it may be of a much smaller memory size, for example, $5 \times 256$; and inexpensive programmable read only memories may then be used to generate the actual video information.

What is claimed is:

1. A method for generating a plurality of moving objects on a video raster scan television display screen scanned in successive frames by an image forming beam traversing the screen along a plurality of horizontal lines in response to horizontal and vertical synchronizing signals which also provide horizontal and vertical retrace intervals and where manual control inputs are provided for a plurality of game players said control inputs determining the motion of said objects said method comprising the following steps: storing data indicative of the locations at which the objects are to be displayed on said screen; during a horizontal retrace interval scanning said stored data to determine any locations to be displayed for the next horizontal line to be scanned; temporarily storing information in locations in a random access memory representing said next horizontal line in accordance with said stored location; delivering an output display signal when the position of the beam corresponds to such location; thereafter during the next horizontal retrace interval scanning said stored data to determine any locations to be displayed for the line after said next horizontal line to be scanned; updating said locations in said random access memory with information representing such line after next; and updating said stored data of said first step during vertical retrace in response to a player control input.

2. A method as in claim 1 where each object has an identification code and where in said first step said data stored in predetermined memory locations is representative of the identification code.

3. A method as in claim 2 including graphics generator means for supplying video data to said image forming beam and where said random access memory actuates said graphics generator means which is responsive to said object identification code stored in said random access memory to cause an object having a predetermined pictorial configuration corresponding to said identification code to be displayed on said screen.

4. A method as in claim 1 where said steps of scanning during a horizontal retrace interval, temporarily storing, and delivering an output display signal are repeated until a frame is completed.

5. A method as in claim 1 where complex fixed objects are generated around which said moving objects move including the steps of storing data representative of the shape of segments of said fixed objects which may be displayed in four angular orientations, storing binary data with one portion indicative of said shape of said segment and another portion its angular orientation, and in response to said one portion of binary data, reading out and displaying said data representative of the shape of a predetermined segment and rotating such segments to the proper angular orientation in response to said other portion, and concurrently displaying in contiguous relationship said data representative of the shape of said predetermined segment in a plurality of angular orientations.

6. A method for generating complex fixed objects on a raster scan video display screen around which a plurality of moving objects move including the steps of storing data representative of the shape of segments of said fixed objects which may be displayed in more than one angular orientation, storing binary data with one portion indicative of said shape of said segment and another portion its angular orientation, in response to said one portion of binary data, reading out and displaying said data representative of the shape of a predetermined segment, and rotating such segment, to the proper angular orientation in response to said other portion, and concurrently displaying in contiguous relationship said data representative of the shape of said predetermined segment in a plurality of angular orientations.

7. A method as in claim 6 where said binary data is set up during the vertical retrace interval of said raster scan.

* * * * *